United States Patent [11] 3,622,528

[72] Inventor Juan Longoria, III
  Lake Jackson, Tex.
[21] Appl. No. 736,556
[22] Filed June 13, 1968
[45] Patented Nov. 23, 1971
[73] Assignee The Dow Chemical Company
  Midland, Mich.

[54] POLYETHYLENIMINE FATTY ACID EPICHLOROHYDRIN PRODUCT
  9 Claims, No Drawings
[52] U.S. Cl. ................................................. 260/18,
  162/164, 260/2, 260/29.2
[51] Int. Cl. ................................................ C08g 33/08
[50] Field of Search .................................... 260/2 EN,
  18 N, 18:29.2 EP; 162/164

[56] References Cited
UNITED STATES PATENTS
3,313,736  4/1967  Dickson et al. ................  260/2 X
2,882,185  4/1959  Valko et al. ....................  260/18 UX
2,969,302  1/1969  Green .............................  162/164
2,926,154  2/1960  Keim ..............................  260/29.2
2,601,597  1/1952  Daniel ............................  162/182 X FOREIGN PATENTS
6,612,293  3/1967  Netherlands ..................  260/2 EN
1,156,516  6/1969  Great Britain ................  260/29.2

Primary Examiner—Donald E. Czaja
Assistant Examiner—C. Warren Ivy
Attorneys—Griswold & Burdick and D. B. Kellom ABSTRACT: An improved polyethylenimine adduct for cellulosic products is prepared by condensing polyethylenimine with 0.05–0.4 mole of a $C_{12}$–$C_{22}$ fatty acid and thereafter capping the residual free amino groups by reaction in aqueous solution at 0°–50° C. with epichlorohydrin. The resulting product is an effective softener, sizing agent, and wet-strength additive for paper and other cellulosic products with superior color stability and increased resistance to yellowing.

3,622,528

POLYETHYLENIMINE FATTY ACID EPICHLOROHYDRIN PRODUCT

BACKGROUND

Numerous polyamine condensation products with a wide variety of acylating and alkylating agents including fatty acids and epichlorohydrin have been described and recommended as additives for paper, textiles, and other cellulosic products. For example, Dudley U.S. Pat. No. 2,479,480 describes fatty acid condensates of water-soluble thermosetting alkylenepolyamine resins while Reynolds U.S. Pat. No. 2,772,969 recommends colloidal dispersions of such condensates as sizing agents for paper. Dickson et al. U.S. Pat. No. 3,301,783 describes the use of acylated polyethylenimines as corrosion inhibitors in lubricants. German Pat. No. 717,155 describes a condensation product of polyethylenimine and stearoyl chloride useful as a softening agent and surfactant in treating textiles.

A major weakness of these and other polyamine products is the oxidative discoloration which occurs on exposure to air, particularly in the presence of light.

Currently the only major commercial products are the polyamidopolyamine-epichlorohydrin polymers described by Keim U.S. Pat. Nos. 2,926,116 and 2,926,154. These resins, prepared by condensation of a saturated aliphatic dibasic acid with an alkylenepolyamine such as diethylenetriamine and thereafter by reaction of the polyamidopolyamine with from 0.5-2.0 moles epichlorohydrin/secondary amino group, are effective and widely used wet-strength additives for paper.

SUMMARY OF THE INVENTION

A process has been discovered for preparing new and improved water-soluble substantive polyethylenimine derivatives useful as an additive for cellulosic products and having superior color stability when incorporated in such products. More specifically the process comprises: (A) condensing polyethylenimine with about 0.05-0.4 mole of a $C_{12}$—$C_{22}$ fatty acid to yield a water-soluble aminopolyamide; and thereafter (B) capping the residual amino groups by reaction in aqueous solution at about 0°-50° C. with at least 0.8 mole and preferably about 0.85-1.2 mole of epichlorohydrin per amino group.

The resulting polyethylenimine fatty acidepichlorohydrin condensation product is a water-soluble thermosetting resin with a blend of physical and chemical properties highly desirable for paper or textile applications. It is stable as a 15-30 weight percent aqueous solution at about pH 2.0-7.5, but cures readily when the solution or treated product is dried or made strongly alkaline. It is an effective sizing agent when applied to paper at a loading of at least about 0.1 weight percent, preferably about 0.5-5.0 weight percent. It can be used with alkaline paper pulps as well as acidic or neutral pulps. In addition to imparting a high degree of water resistance, it also significantly improves the wet strength of paper and textiles. Also when applied in a lower concentration of about 0.05-0.50 weight percent it imparts a significant softness to the treated products. Furthermore the treated product and its aqueous solutions have enhanced resistance to yellowing on aging coupled with good stability and shelf life.

REACTANTS

Polyethylenimine (PEI) is a commercially available water-soluble cationic polymer formed by polymerization of ethylenimine as described, for example, by Ulrich U.S. Pat. No. 2,182,306 and Wilson U.S. Pat. No. 3,203,910. It is a highly branched polymer with a ratio of primary/secondary/tertiary nitrogens of approximately 1/1.5 to 2.0/1.

Particularly desirable for use herein are the polymers prepared by an acid-catalyzed, anhydrous polymerization of ethylenimine having an average molecular weight of about 500-5,000 based on ebulliometric methods. However, higher molecular weight polyethylenimines, including products made in aqueous solution and having an average molecular weight of 100.000 or more, can also be used.

To impart the desired water resistance and softer hand, a $C_{12}$—$C_{22}$ fatty acid is used. Particularly suitable are saturated $C_{12}$13 $C_{18}$ fatty acids such as lauric, palmitic and stearic acids which are readily available and have good chemical stability. Also suitable are the fatty acid mixtures available from the hydrogenation of tall oil, cottonseed oil or coconut oil. For some applications unsaturated $C_{12}$—$C_{22}$ fatty acids such as oleic acid, linoleic acid, and tall oil can be used.

To cap the residual amino groups of the PEI fatty acid condensate, epichlorohydrin is the preferred reagent although epibromohydrin can also be used. Under appropriate conditions the epihalohydrin can be formed in situ from a 1,3-dihalo-2-propanol and a suitable base.

PROCESS CONDITIONS

To obtain a requisite water-soluble product, about 5-45 mole percent of the PEI nitrogen atoms should be amidated with the $C_{12}$—$C_{22}$ fatty acid. A higher substitution yields water-insoluble products while a lower substitution gives products with inadequate softening and sizing properties. Generally it is preferable to amidate the PEI with about 0.1-0.3 mole fatty acid per mole PEI nitrogen.

Amidation to give the intermediate aminopolyamide is achieved in a conventional manner by heating the polyethylenimine and fatty acid at about 120°—210° C. until at least 85 percent of the theoretical water has been evolved. An organic diluent such as toluene or xylene will facilitate the reaction by removing the water azeotropically. Alternately the desired acylation can be achieved with an appropriate acylhalide as described by Reynolds et al. U.S. Pat. No. 2,772,969.

To cap the residual PEI amino groups, the aminopolyamide is dissolved in water and reacted with epihalohydrin under controlled conditions yielding a stable water-soluble polymer in which the amino groups are substituted with a propylenehalohydrin group, e.g. —$CH_2$—$CHOH$—$CH_2X$ where X is Br or Cl. The resulting water-soluble product is stable in the halohydrin form in neutral or mildly acidic aqueous solutions, e.g. at about pH 2.0-7.5. If the solution becomes alkaline, the halohydrin groups are converted into epoxide form with subsequent cross-linking and insolubilization of the polymer.

To obtain a stable water-soluble product, cross-linking must be minimized by reacting the aminopolyamide and epihalohydrin in aqueous solution at about 0°-50° C. Preferably the epihalohydrin is added gradually to a 10-25 percent aqueous solution of the aminopolyamide over about 0.5-2.0 hours at 20°-40° C. Sufficient epihalohydrin is required to cap at least 80 mole percent of the residual free amino groups. Therefore normally about 0.85-1.20 mole of epichlorohydrin per mole of amino nitrogen is added to the aqueous aminopolyamide solution. A larger excess of epichlorohydrin often requires further treatment to obtain a clear stable product solution.

High conversions are achieved by stirring the reactants at 20°-50 C. for 1-4 hours after complete addition of the epihalohydrin. Then, if necessary, the aqueous product solution is heated at about 50°-100° C. to remove haziness caused by residual epihalohydrin. The resulting clear product solution is then cooled and if necessary the pH adjusted to about 2-7.5, preferably to about 5-7. Such a solution containing 15-30 weight percent of the polyethylenimine fatty acid epihalohydrin product is stable for an extended time at room temperature. However heating to dryness or adding a strong base rapidly transforms the product into a water-insoluble resin.

TREATMENT OF CELLULOSIC PRODUCTS

The cationic PEI fatty acid Epi products are readily absorbed from aqueous solution by cellulosic materials. The amount of additive applied depends both upon the specific cellulosic product being treated and the desired properties. But in general additive concentrations ranging from about 0.05–5.0 weight percent are most useful. Optimum softness of a cotton fabric is generally obtained with a loading of about 0.1–2.0 weight percent and such treatment facilitates mechanical finishing operations as well as increases the life and utility of the fabrics. However, optimum sizing generally requires a loading of about 0.5–2.5 weight percent based on dry weight of the cellulosic product. But unlike many commercial sizing agents, these PEI derivatives also contribute a significant degree of wet strength.

Since these additives are effective over a pH range of about 3.0–11.0, they can be used with alkaline paper pulps which cannot be treated with melamine or urea-formaldehyde resins. Also these additives can be used alone with no treatment other than drying required to develop a durable treated product. Yet they can be used if desired in conjunction with conventional fillers and additives including rosin, clay, and calcium carbonate.

When used as paper additive, these PEI derivatives are preferably added to the pulp slurry at the beater, stock chest, head box or other point permitting adequate mixing prior to formation of the paper sheet. Alternately preformed paper sheets can be sprayed or dipped in an aqueous PEI fatty acid EPI solution. Application in this manner is of course preferred for treating textile products.

Finally drying the impregnated or treated product at about 40°–150° C., preferably about 70°–120° C., transforms the water-soluble product into a cross-linked water-insoluble resin which imparts the desired softer hand and/or increased water resistance and wet-strength properties to the treated product. The improved color stability has been established both for the aqueous product solution and for the treated cellulosic products.

The following examples illustrate further this invention. Unless otherwise specified, all parts and percentages are by weight.

EXAMPLE 1

PEI Fatty Acid Epichlorohydrin Products

The polyethylenimine (PEI) used in the following runs was prepared by an acid-catalyzed polymerization of ethylenimine and contained about 20–25 percent tertiary amino groups.

A. A mixture of 680 parts (3.4 mole) lauric acid, 680 parts (15.8 moles) of PEI having an average molecular weight of 1200 and 600 parts of xylene was heated at 150°–158° C. for 1.5–2.0 hours with azeotropic removal of water. When 57 parts (3.2 moles) of water had been removed, the mixture was cooled and the xylene stripped in vacuo leaving about 1,300 parts of a light amber, viscous, water-soluble liquid amino polyamide.

About 100 parts (1.22 mole total N basis) of the aminopolyamide was added to 572 parts of water. To speed dissolution, the mixture was stirred at 70° C. and then the solution containing about 15 percent solids was cooled to 25° C. Then 90.5 parts (0.98 mole) epichlorohydrin was added with stirring in 0.5–1.0 hour. After stirring another hour at 25° C. the aqueous mixture heated for 2 hours at 50° C. to complete the reaction and obtain a clear stable solution containing 25 percent total solids. Its pH was about 7.

B. In like manner a series of animopolyamides have been prepared from polyethylenimine with an average MW ranging from 600–100,000 and a variety of $C_{12}$—$C_{22}$ fatty acid including lauric, oleic, stearic and tall oil acids and then capped by reaction with epichlorohydrin. Typical products are shown in tables 1 and 2.

TABLE 1
[PEI-Fatty acid-amino polyamides]

| Run | Reactants PEI (M.W.) | Fatty acid | Wt. ratio FA/PEI | Mole ratio FA/N | Product |
|---|---|---|---|---|---|
| 1–1 | 1,200 | Lauric | 1.0 | 0.22 | Viscous amber liquid. |
| 1–2 | 1,200 | Oleic | 0.5 | 0.076 | Light amber liquid. |
| 1–3 | 1,200 | Lauric | 0.5 | 0.11 | Viscous amber liquid. |
| 1–4 | 1,200 | Tall oil * | 2.0 | 0.30 | Dark amber liquid. |
| 1–5 | 1,200 | Stearic | 1.0 | 0.15 | Waxy solid. |
| 1–6 | 600 | do | 2.0 | 0.30 | Tan waxy solid. |
| 1–7 | 1,200 | Lauric | 2.0 | 0.43 | Do. |
| 1–8 | 1,200 | Oleic | 2.0 | 0.30 | Very viscous liquid. |
| 1–9 | 1,200 | Stearic | 0.5 | 0.075 | Tan waxy solid. |
| 1–10 | ᵇ 100,000 | Lauric | 1.28 | 0.28 | Do. |

* Commercial "Octinol FA-3" from Arizona Chemical Co. (analysis: 98.7% fatty acids, 47% polyunsaturated acids as linoleic acid, 51% oleic acid, 2% saturated fatty acids).
ᵇ Dried azeotropically prior to reaction with lauric acid.

TABLE 2
[PEI-Fatty acid-Epi products]

| No. | Aminopolyamide No. | PEI (M.W.) | FA | Wt. ratio Epi/PEI-FA | Mole ratio PEI | FA | Epi |
|---|---|---|---|---|---|---|---|
| 2–1 | 1–1 | 1,200 | Lauric | 0.905 | 1.0 | 0.22 | 0.80 |
| 2–2 | 1–1 | 1,200 | do | 0.85 | 1.0 | 0.22 | 0.75 |
| 2–3 | 1–7 | 1,200 | do | 0.41 | 1.0 | 0.43 | 0.53 |
| 2–4 | 1–4 | 1,200 | Tall oil | 0.50 | 1.0 | 0.30 | 0.67 |
| 2–5 | 1–8 | 1,200 | Lauric | 0.50 | 1.0 | 0.30 | 0.67 |
| 2–6 | 1–9 | 1,200 | Stearic | 1.33 | 1.0 | 0.075 | 0.91 |
| 2–7 | 1–6 | 600 | do | 0.52 | 1.0 | 0.30 | 0.70 |
| 2–8 | 1–8 | 1,200 | Oleic | 0.50 | 1.0 | 0.31 | 0.69 |

Except for the lauric acid derivative of Run 1–7 the aminopolyamides and their Epi reaction products gave stable clear aqueous solutions at a PEI-FA product concentration of about 10–20 wt.% at 25° C. and a PEI-FA-Epi product concentration of about 15–30 wt.% at 25° C.

EXAMPLE 2

Use as a Cellulosic Sizing Agent

A. Paper hand sheets were made from unbleached Kraft paper pulp or bleached Western Softwood sulfite paper pulp following the general procedure of TAPPI Standard T 205–58 modified by using a drying cycle of 45 sec. at 120° C. and then 1 hour at 110° C. in a forced draft oven. Each test sheet was aged for 24 hours at 23° C. and 60 percent relative humidity prior to testing.

The sizing of aged test sheets is measured by clamping a weighed sheet in a holder so that a 2.54 cm. diameter ring is firmly held to the upper surface at about the midsection of the test sheet. A Photovolt Reflectance Meter Model 610 (Photovolt Corporation, N.Y.) equipped with a Green Trestimulus Filter and Search Unit 601–Y is mounted with the photocell held directly below the ring. After adjusting the meter to 100 percent reflectance, the ring is filled with Shaeffer's Script No. 2 ink and the sizing efficiency of the additive is determined measured by (a) the time (sec.) required for the reflectance to drop to 50 percent of the initial value, or (b) the percent reflectance after 1,000 sec.

B. Typical sizing results using the PEI-FA-Epi products of example 1 and several commercial sizes with paper pulps having an initial pH of 4.5, 6.5, and 8.5. are shown in table 3. Except for PEI 2–3, the water-insoluble product with a high fatty acid ratio, the PEI adducts are superior sizes at a loading of about 1–2 weight percent with acid, neutral and alkaline pulps.

TABLE 3.—SIZING VALUES

| Test | Pulp pH | Additive [a] | Sizing value [b] at additive loading [c] of (percent) — | | | | |
|------|---------|--------------|---------|---------|---------|---------|---------|
|      |         |              | 0.5 | 0.75 | 1.0 | 1.5 | 2.0 |
| 3-1  | 4.5 | PEI 2-1 | 50%/7 | 50%/55 | 58%/10³ | 78%/10³ | 81%/10³ |
| 3-2  |     | PEI 2-2 | 50%/6 | 52%/10³ | 71%/10³ | 71%/10³ |  |
| 3-3  |     | PEI 2-3 | 50%/2 | 50%/2 | 50%/4 | 50%/444 | 71%/10³ |
| 3-4  |     | PEI 2-4 | 50%/2 | 50%/2 | 50%/11 | 81%/10³ |  |
| 3-5  |     | PEI 2-5 | 50%/2 | 50%/5 | 70%/10³ | 75%/10³ |  |
| 3-6  |     | PEI 2-6 | 50%/3 | 50%/6 | 50%/147 | 74%/10³ | 82%/10³ |
| 3-7  |     | Rosin-alum | 50%/10 | 50%/35 | 50%/170 | 50%/286 | 50%/282 |
| 3-8  |     | Cyron size | 50%/5 | 50%/13 | 50%/51 | 70%/10³ | 70%/10³ |
| 3-9  | 6.5 | PEI 2-1 | 50%/2 | 50%/12 | 57%/10³ | 88%/10³ | 94%/10³ |
| 3-10 |     | PEI 2-2 | 50%/2 | 50%/6 | 80%/10³ | 94%/10³ |  |
| 3-11 |     | PEI 2-3 | 50%/2 | 50%/2 | 50%/2 | 50%/3 | 75%/10³ |
| 3-12 |     | PEI 2-4 | 50%/2 | 50%/4 | 50%/117 | 67%/10³ |  |
| 3-13 |     | PEI 2-6 | 50%/3 | 50%/20 | 50%/867 | 71%/10³ | 84%/10³ |
| 3-14 |     | Rosin-alum [d] | X | X | X | X | X |
| 3-15 | 8.5 | PEI 2-1 | 50%/2 | 50%/6 | 50%/199 | 83%/10³ | 90%/10³ |
| 3-16 |     | PEI 2-2 | 50%/2 | 50%/3 | 66%/10³ | 80%/10³ |  |
| 3-17 |     | PEI 2-3 | 50%/2 | 50%/2 | 50%/2 | 50%/6 | 65%/10³ |
| 3-18 |     | PEI 2-4 | 50%/3 | 50%/5 | 50%/7 | 71%/10³ |  |
| 3-19 |     | PEI 2-5 | 50%/2 | 50%/4 | 50%/6 | 58%/10³ |  |
| 3-20 |     | PEI 2-6 | 50%/3 | 50%/4 | 50%/200 | 81%/10³ | 90%/10³ |
| 3-21 |     | Rosin-alum [d] | X | X | X | X | X |
| 3-22 |     | Cyron size | 50%/2 | 50%/2 | 50%/3 | 50%/3 | 50%/12 |

[a] PEI-FA-Epi derivatives from Table 2 (rosin-alum: conventional rosin-aluminum sulfate size; cyron size: a stearic acid polyamide from American Cyanamid).
[b] Reflectance/sec. after ink application.
[c] Wt. percent based on dry paper pulp.
[d] The rosin-alum size requires an acidic pulp with pH below 5.5.

C. As a comparison with the polyamine derivatives of the prior art, a solution of 170.1 parts (0.90 mole) of tetraethylenepentamine (TEPA) in 180.6 parts water was condensed with 83.3 parts (0.90 mole) epichlorohydrin as described in Dudley U.S. Pat. No. 2,479,480. A portion of the resulting TEPA-Epi condensation product was condensed with 0.1 mole lauric acid per mole N using xylene to azeotrope the water as described by Dudley. A second portion was similarly acylated with stearic acid. These products were then evaluated as sizing agents as described above. The results along with comparative data for the present PEI-FA-Epi products having a similar lauric or stearic acid content are given in table 4.

TABLE 4.—COMPARATIVE SIZING TESTS

| Test | Pulp pH | Additive | Sizing values: loading of (percent)— | | | |
|------|---------|----------|------|------|------|------|
|      |         |          | 0.5 | 1 | 1.5 | 2.0 |
| 4-1  | 4.5 | TEPA-epi-lauric [a] | 50%/12 | 50%/3 | 50%/2 | 50%/3 |
| 4-2  | 4.5 | TEPA-Epi-stearic [a] | 50%/100 | 74%/10³ | 76%/10³ | 73%/10³ |
| 3-1  | 4.5 | PEI-lauric-Epi | 50%/7 | 58%/10³ | 78%/10³ | 81%/10³ |
| 3-6  | 4.5 | PEI-stearic-Epi | 50%/3 | 50%/147 | 74%/10³ | 82%/10³ |
| 4-3  | 7.5 | TEPA-Epi-lauric [a] | 50%/5 | 50%/21 | 50%/28 | 50%/16 |
| 4-4  | 7.5 | TEPA-Epi-stearic [a] | 50%/120 | 77%/10³ | 80%/10³ | 88%/10³ |
| 3-15 | 8.5 | PEI-lauric-Epi | 50%/2 | 50%/199 | 83%/10³ | 90%/10³ |
| 3-20 | 8.5 | PEI-stearic-Epi | 50%/3 | 50%/200 | 81%/10³ | 90%/10³ |

[a] Dudley U.S. 2,479,480.

EXAMPLE 3

Use as a Wet Strength Additive

Not only are the PEI-FA-Epi products of example 1 effective sizes, but in addition to imparting a high degree of water resistance they also increase the wet strength of the treated paper and textile products. Typical results are given in table 4.

An unbleached sulfite spruce pulp with a Canadian Standard Freeness of 500 ml. was used following the general procedure of TAPPI Method T-403. Hand sheets were prepared by TAPPI Method T-205 modified in the drying cycle by curing in a a steam-heated press at 120° C. for 45 sec. and then in an oven at 105° C. for 1 hour. The test sheets were conditioned at 23° C. and 50 percent relative humidity prior to testing. After weighing, the hand sheets were soaked in water for 4 hours, blotted to remove excess water and tested on a Muellens Burst Tester.

TABLE 5.—WET STRENGTH VALUES

| Test | Additive | Wet burst strength (p.s.i.): loading of (percent)— | | | | | |
|------|----------|------|------|------|------|------|------|
|      |          | 0.25 | 0.50 | 0.75 | 1.0 | 1.5 | 2.0 |
| 5-0  | None | 3.0 |  |  |  |  |  |
| 5-1  | PEI 2-1 | 7.1 | 14.4 | 19.6 | 24.6 | 28.5 | 29.7 |
| 5-2  | PEI 2-6 | 2.5 | 3.4 | 7.8 | 8.0 |  | 20.7 |

Although the sizing and wet-strength functions are distinctly different, note that these PEI-FA-Epi products not only are effective sizing agents when used at a loading of about 1.0 weight percent or more as shown in example 2, but also give a significant increase in wet strength at loadings as low as 0.25 percent.

EXAMPLE 4

Use as a Softening Agent

For use as a softening agent for paper or textiles, a PEI-FA-Epi product containing about 0.2–0.35 moles FA/PEI nitrogen is preferred.

A. To demonstrate the utility of the PEI-Lauric Acid-Epi Product 2–1 as a softener, lightweight paper hand sheets were prepared from an unbleached sulfite pulp having a freeness of 550±50 ml. C.S.F. and a pH of 7.0 diluted to a 0.11 percent pulp suspension by the general procedure described in example 3. The test sheets were conditioned overnight under standard TAPPI conditions and then measured for stiffness/limpness, dry tensile strength and water absorbency.

In determining the stiffness 15 mm. strips of the test sheets are cut to a length of 7.5 inches (19.0 cm.) weighed and clamped horizontally so that 3.0 inches (7.62 cm.) protrudes beyond the clamp. The horizontal deflection of the end of the strip is measured, the strip is turned over and the deflection again measured. Using the average value for six test strips, the compound modulus of tensile and compression (E) is calculated by the formula:

$$E(g./cm.^2) = 3Wl^3/2bz^3\Delta$$

where $W$ = weight of strip in grams
$l$ = length of strip in centimeters
$b$ = width of strip in centimeters
$z$ = average thickness of strip in centimeters
$\Delta$ = deflection in centimeters The dry tensile strength and breaking length of the test strips were then measured using a test span of 90 mm. and a stretching speed of 1.27 cm./min.

The water absorbency was determined by TAPPI Method T-432 using a 0.1 ml. water drop and measuring the time required for it to be absorbed into the paper.

TABLE 6.—PAPER SOFTENING AGENTS

| Test | Additive a | Thickness Z, mm. | Wt., g. | Deflection Δ, cm. | Modulus E, g./cm.²×10⁻⁷ | H₂O absorp. time, sec. | Dry breaking length, m.b |
|---|---|---|---|---|---|---|---|
| 6-0 | None | 0.113 | 0.156 | 1.28 | 1.487 | 302 | 5,440 |
| 6-1 | 0.05% PEI 2-1 | 0.108 | 0.152 | 1.858 | 1.142 | 325 | 5,020 |
|  | 0.10% PEI 2-1 | 0.108 | 0.149 | 1.925 | 1.077 | 322 | 5,090 |
|  | 0.20% PEI 2-1 | 0.108 | 0.149 | 1.558 | 1.327 | 357 | 5,330 |
|  | 0.50% PEI 2-1 | 0.108 | 0.145 | 1.658 | 1.248 | >1,000 | 5,080 |
| 6-2 | 0.05% QN | 0.109 | 0.152 | 1.525 | 1.359 | 222 | 4,940 |
|  | 0.20% QN | 0.108 | 0.149 | 1.591 | 1.333 | 386 | 4,180 |
|  | 0.50% QN | 0.126 | 0.182 | 1.283 | 1.256 | 351 | 4,090 |
|  | 0.50% QN | 0.126 | 0.182 | 1.283 | 1.256 | 351 | 4,090 | a PEI 2-1: PEI-lauric acid-Epi; QN: Dihydrogenated & allow dimethyl ammonium chloride (Arquad 2HT) from Armour Industrial Chemicals.
b Determined after curing at 110° C. for 0.5 hr.

B. A cotton broadcloth (3.8 oz./yd.²) was impregnated by padding with an aqueous solution of PEI 2-8 and then tumble-dried in an electric dryer for 30 min. at 80°–85° C. The add-on weight was 0.54 percent on a solids basis. The treated broadcloth after conditioned for 18 hours at 21° C. and 65 percent relative humidity was rated by a test panel considerably softer than a control untreated sample. Another treated cloth with an add on of 1.56 percent was rated slightly softer than the untreated cloth.

EXAMPLE 5

Color Stability

The use of polyethylenimine and its derivatives in many areas including paper wet strength, and dimensional stabilization of textiles has been hindered by the tendency of these polymers to yellow upon aging or heating in the presence of air as in many drying operations. A modification of TAPPI methods T452 and T217 was developed using standard white broadcloth substrate. The test polymer was applied from aqueous solution with a laboratory padder and then the samples were given a minimal drying by heating at 80° C. for 2 minutes. Test samples cut from the treated cloth were then heated for 30 min. at 120° C. or 150° C. in a forced-air oven, cooled, and measured for reflectance using a Photovolt Search Unit 610-W with a blue Kodak Wratten Filter No. 49.

Typical results shown in table 7 demonstrate the greater color stability of the PEI-FA-Epi products even when an unsaturated fatty acid such as tall oil is used.

A similar increase in color stability is observed when the PEI-FA-Epi products are used as additives for paper, for sizing glass fibers and for improving the strength of cellophane films.

I claim:

1. In a process for preparing a water-soluble polyethylenimine additive for cellulosic products, the improvement which comprises:

A. Condensing a water-soluble polyethylenimine having a molecular weight of at least about 500 with about 0.05–0.45 mole of a $C_{12}$—$C_{22}$ fatty acid per polyethylenimine nitrogen to yield a water-soluble aminopolyamide; and thereafter,
   B. Capping the free amino groups of the aminopolyamide by reaction in aqueous solution at about 0°–50° C. with at least 0.8 mole of epichlorohydrin per amino group to yield a water-soluble, thermosetting polyethylenimine fatty acid epichlorohydrin resin soluble in water as a 15–30 weight percent at pH 2.0–7.5 and 25° C.

2. The process of claim 1 where the polyethylenimine has an average molecular weight of about 500–5,000.

3. The process of claim 1 where the fatty acid is lauric acid.

4. The process of claim 1 where the fatty acid is stearic acid.

5. The process of claim 1 where the ratio of fatty acid is about 0.1–0.3 mole per polyethylenimine nitrogen.

6. The process of claim 1 where the free amino groups are capped by reaction with 0.85–1.2 mole epichlorohydrin per free amino group.

7. A polyethylenimine fatty acid epichlorohydrin condensation product prepared by the process of claim 2.

8. The process of claim 1 where the fatty acid is oleic acid.

9. The process of claim 1 where the fatty acid is tall oil.

TABLE 7.—ACCELERATED COLOR STABILITY TEST

| | | | Percent reflectance | | |
|---|---|---|---|---|---|
| Test | PEI additive | Pick-up, percent | 80° C./ 2 min. | 120° C./ 80 min. | 15° C./ 80 min. |
| 7 A-1 | PEI (1,200 M.W.) | 0.64 | 87.8 | 80.8 | 69.4 |
| 7 A-2 | PEI (1,800 M.W.) | 0.68 | 88.4 | 71.0 | 68.3 |
| 7 A-3 | PEI (100,000 M.W.) | 0.68 | 83.5 | 70.8 | 57.1 |
| 7 B-1 | PEI 1-1 (PEI plus lauric acid) | 0.61 | 86.0 | 72.8 | 59.5 |
| 7 B-2 | PEI 1-6 (PEI plus stearic acid) | 0.65 | 88.1 | 76.3 | 66.1 |
| 7 B-3 | PEI 1-4 (PEI plus tall acid) | 0.60 | 82.4 | 62.5 | 55.1 |
| 7 C-1 | PEI 2-1 (PEI plus lauric plus Epi) | 0.67 | 88.9 | 85.5 | 78.0 |
| 7 C-2 | PEI 2-7 (PEI plus stearic plus Epi) | 0.67 | 89.0 | 84.5 | 72.3 |
| 7 C-3 | PEI 2-4 (PEI plus tall plus Epi) | 0.69 | 87.9 | 85.1 | 70.8 |